US006766920B2

(12) United States Patent
Yuyama et al.

(10) Patent No.: US 6,766,920 B2
(45) Date of Patent: Jul. 27, 2004

(54) MEDICINE FEED UNIT

(75) Inventors: Shoji Yuyama, Toyonaka (JP); Nakaji Takeda, Toyonaka (JP); Yasuhiro Shigeyama, Toyonaka (JP); Chisei Asaoka, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 163 days.

(21) Appl. No.: 10/227,435

(22) Filed: Aug. 26, 2002

(65) Prior Publication Data

US 2003/0062388 A1 Apr. 3, 2003

(30) Foreign Application Priority Data

Sep. 13, 2001 (JP) ....................................... 2001-278132

(51) Int. Cl.[7] ................................................ B65G 59/00
(52) U.S. Cl. ....................................... 221/266; 221/277
(58) Field of Search .......................... 221/7, 9, 13, 265, 221/266, 277

(56) References Cited

U.S. PATENT DOCUMENTS 4,674,652 A * 6/1987 Aten et al. ..................... 221/3
5,860,563 A * 1/1999 Guerra et al. ............... 221/172

FOREIGN PATENT DOCUMENTS

JP 2000-255651 9/2000

* cited by examiner

*Primary Examiner*—Kenneth Noland
(74) *Attorney, Agent, or Firm*—Wenderoth, Lind & Ponack, L.L.P.

(57) ABSTRACT

The present invention provides a medicine feed unit 1 which can reliably feed a predetermined number of medicine sticks 5 without requiring a work for aligning the medicine sticks. The medicine feed unit 1 is equipped with a medicine housing container 3 for housing a plurality of medicine sticks 5 each obtained by packaging a medicine in a cylindrical bag sealed at both end portions and a medicine feeding section 4, to which the medicine housing container 3 is removably attached and which feeds the medicine sticks 5 one by one. The medicine feeding section 4 includes conveyance means 10 having a passage 14, on which the medicine stick 5 can be conveyed in a longitudinal direction thereof, a medicine feeding container 11 having an inclined surface 11*a* for moving the medicine stick 5 conveyed by the conveyance means 10 diagonally downward toward a direction perpendicular to a longitudinal direction, a rotor 12, which is disposed in the medicine feeding container 11 so that rotation thereof can be driven and conveys the medicine stick 5 moved along the inclined surface 11*a* while holding them in a holding depressed portion 22 formed in an outer periphery.

19 Claims, 10 Drawing Sheets

(a)

(b)

(a)

(b)

MEDICINE FEED UNIT

BACKGROUND OF THE INVENTION

The present invention relates to a medicine feed unit suitable for feeding of medicines packaged in stick-like bags.

Conventionally, as an apparatus for feeding stick-like medicines (medicine sticks) such as, for example, ampoules packaged in bags, the one disclosed in Japanese Patent Laid-open Publication (Kokai) No. 2000-255651 can be mentioned.

In this apparatus, packaged ampoules are housed in a container main body in a state of being aligned in a vertical direction, and rotation of a rotor provided at a lower end portion of the container main body allows the packaged ampoules to be fed one by one by via a housing groove formed in an outer peripheral surface of the rotor.

However, in the aforementioned conventional apparatus, a complicated work of aligning the packaged ampoules once in the container main body is required. Consequently, an apparatus has been desired in which a predetermined number of medicine sticks such as packaged ampoules can be appropriately fed without aligning them.

SUMMARY OF THE INVENTION

Accordingly, an object of the present invention is to provide a medicine feed unit by which a predetermined number of medicine sticks can be reliably fed without requiring an aligning work.

As means for achieving the above object, the present invention provides a medicine feed unit equipped with a medicine housing container for housing a plurality of medicine sticks each prepared by packaging a medicine in a cylindrical bag sealed at both end portions, and a medicine feeding section to which the medicine housing container is removably attached and which feeds the medicine sticks one by one, wherein the medicine feeding section comprises:

conveyance means having a passage which allows the medicine stick to be conveyed only in a longitudinal direction thereof;

a medicine feeding container having an inclined surface acting to move the medicine stick conveyed by the conveyance means in a diagonally downward direction which is perpendicular to the longitudinal direction of the medicine stick; and a rotor which is disposed in the medicine feeding container so as to be drivable into rotation, and which conveys the medicine stick moved along the inclined surface while holding the medicine stick in a holding depressed portion formed in an outer periphery thereof.

With this constitution, the conveyance means can be driven to reliably convey a medicine stick in a longitudinal direction thereof. Since the conveyed medicine stick is further moved in the medicine feeding container following the inclined surface, the medicine stick can be fed while being held in the holding depressed portion by rotating the rotor.

It is preferable that the holding depressed portion of the rotor comprises a holding groove for holding a body of the medicine stick, and an escape depressed portion for avoiding interference with both end portions, since wide portions at both ends can be brought into no contact by the escape depressed portion and a state of holding a medicine stick in the holding depressed portion can be stabilized.

The aforementioned medicine feeding container is preferably inclined diagonally downward toward the medicine stick conveyance direction. Furthermore, it is preferable to form a contact surface for assisting entry of the medicine stick into the holding groove by correcting the inclination when the medicine stick is held in the holding groove in a part of the escape depressed portion positioned on a lower side in the holding depressed portion of the rotor.

The medicine housing container is preferably equipped with delivering means for delivering the medicine stick in the longitudinal direction thereof. In this case, it is preferable that a speed of conveying the medicine stick by the conveyance means of the medicine feeding section is made higher than a conveyance speed by the delivering means since a state of feeding the medicine stick into the medicine feeding container can be stabilized.

When the rotor does not properly rotate forward, it is preferable that the rotor is rotated reverse for a predetermined time and then rotated forward again since jamming of a medicine stick can be rapidly eliminated.

It is preferable to include an opening which becomes continuous with the passage of the medicine feeding section when the medicine housing container is attached to the medicine feeding section, and a door which closes the opening when the medicine housing container is removed from the medicine feeding section. Furthermore, for removal of the medicine housing container from the medicine feeding section, it is preferable to drive the delivering means into reverse rotation since the medicine housing container can be removed without dropping medicine stick from the medicine housing container or jamming the medicine stick in the door.

It is preferable to form steps depressed toward a plate thickness direction in both end portions along the medicine stick conveying direction in the inclined surface of the medicine feeding container since jamming of the medicine stick can be reliably avoided.

Furthermore, it is preferable to form a circular plate integrally at least on one end surface of the rotor since a medicine stick can be prevented from being inclined by a rotation of the rotor and reliably discharged.

Furthermore, in another aspect, the present invention provides a medicine feed unit equipped with a medicine housing container for housing a plurality of medicine sticks each prepared by packaging a medicine in a cylindrical bag sealed at both end portions, and a medicine feeding section to which the medicine housing container is removably attached and which feeds the medicine sticks one by one, wherein the medicine feeding section comprises:

conveyance means having a passage which allows the medicine stick to be conveyed only in a longitudinal direction thereof;

a medicine feeding container for housing the medicine stick conveyed by the conveyance means; and a picker in which a rotating disc is disposed in the medicine feeding container so as to be drivable into rotation and is equipped with a holding section that can be changed in direction along with a rotation of the rotating disc between a first position, at which a medicine stick in the medicine feeding container is scooped, and a second position, at which the scooped medicine stick is fed to outside.

BRIEF DESCRIPTION OF THE DRAWINGS

Other objects and features of the present invention will become clear from the following detailed description with reference to the accompanying drawings in which.

DETAILED DESCRIPTION OF THE PREFERRED EMBODIMENTS

Figure 1:
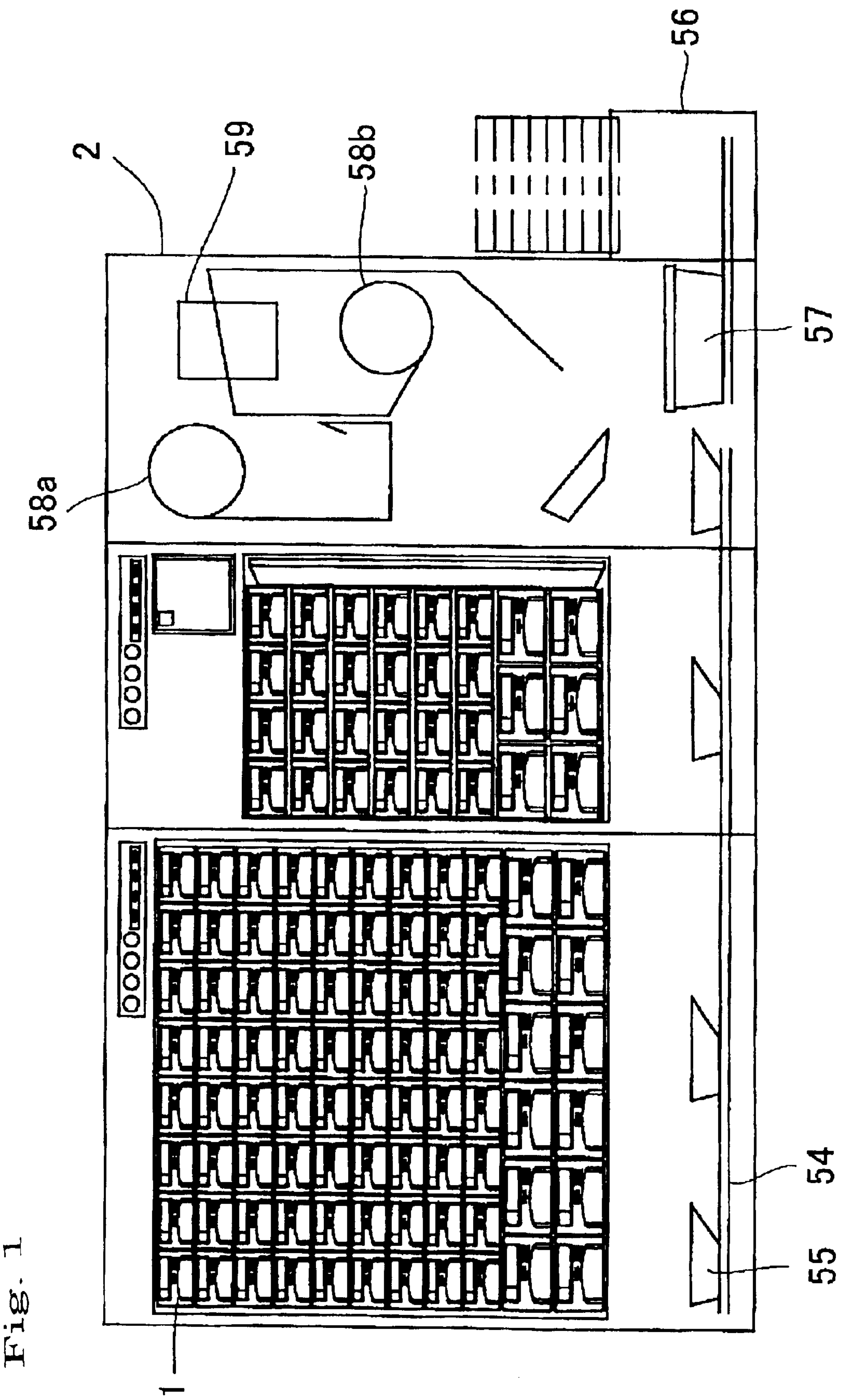
FIG. 1 is a general schematic view showing a medicine feeding apparatus according to this embodiment.

FIG. 1 shows a medicine feeding apparatus 2 in which medicine feed units 1 according to this embodiment are arranged in a matrix. As shown in FIGS. 2–5, the medicine feed unit 1 is constituted by a medicine housing container 3, which is attached to or removed from the medicine feeding apparatus 2, and a medicine feeding section 4 fixed to the medicine feeding apparatus 2.

Figure 5:
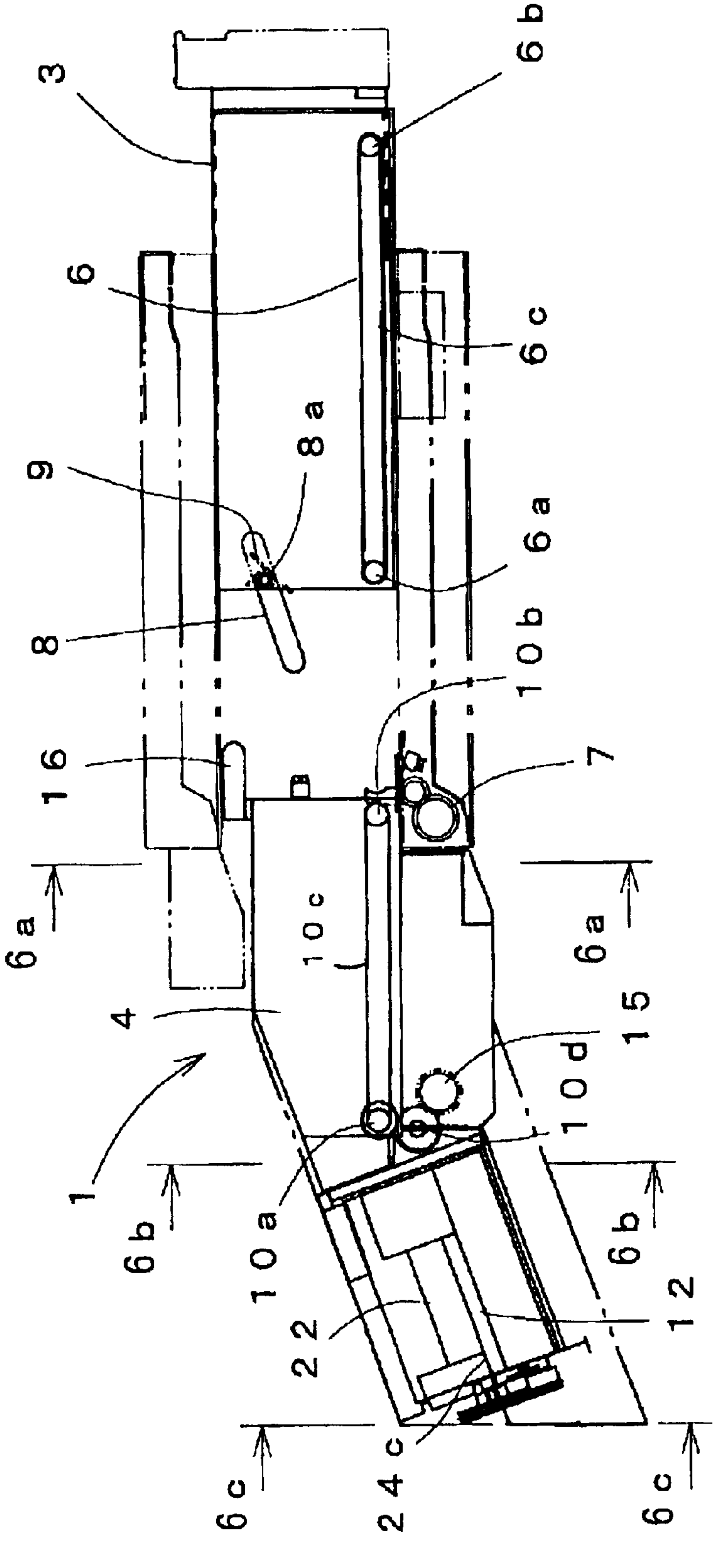
FIG. 5 is a front view of FIG. 4.
Figure 8:
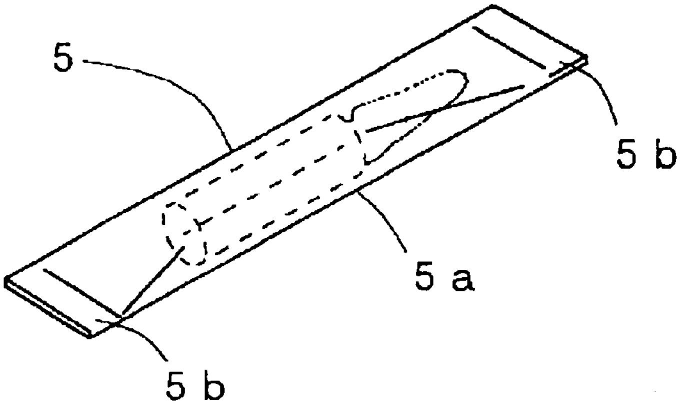
FIG. 8 is a perspective view showing a medicine stick.

As shown in FIGS. 2–5, the medicine housing container 3 has a generally box-like shape of which upper surface is opened and houses medicine sticks 5 at random. As a medicine stick 5, for example, a packaged ampoule obtained by packaging an ampoule in a cylindrical bag and sealing both end portions thereof can be mentioned. As shown in FIG. 8, the both end portions of a circular cylindrical body 5*a* are sealed portions 5*b* wider than an outer diameter thereof. The medicine housing container 3 is constituted by a first belt conveyer 6, of which portion along a side edge portion of a bottom surface is delivering means according to the present invention, and the other portion is an inclined surface 3*a* inclined toward the first belt conveyer 6. As shown in FIG. 5, the first belt conveyer 6 is constituted such that a belt 6*c* is laid on each one end side of rotary shafts 6*a*, 6*b* disposed at both end portions. The one rotary shaft 6*a* integrally includes a gear (not shown). Motive power is transmitted to this gear from a first motor 7 disposed in the medicine feeding section 4 via the rotary shaft and the integrally included gear (not shown). A door 8 is disposed on a part of one end wall of the medicine housing container 3 so that the door can rotate about a spindle 8*a*, and energized by a spring 9 in a closing direction.

Figure 2:
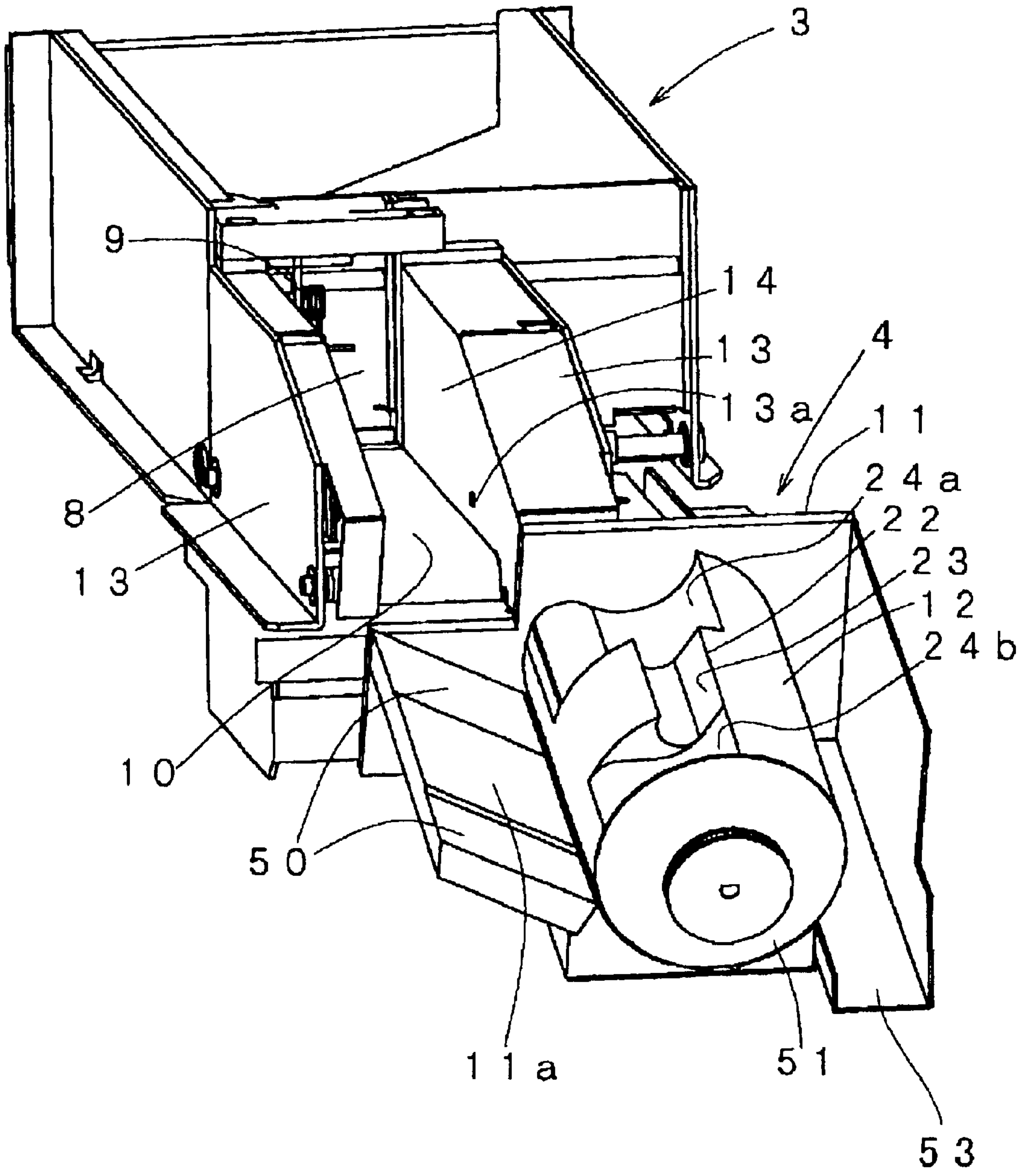
FIG. 2 is a partially removed perspective view showing a medicine feed unit according to this embodiment.

As shown in FIG. 2, the medicine feeding section 4 is equipped with a second belt conveyer 10, which is conveyance means according to the present invention, a medicine feeding container 11 and a rotor 12 disposed inside the medicine feeding container 11.

The second belt conveyer 10 constitutes a bottom surface of a passage 14 formed in a dimension narrower than a length of the medicine stick 5 by sidewalls 13 formed on both sides. A sensor 13*a* is disposed on the sidewall 13 to detect presence or absence of a passing medicine stick 5. A drive of the second belt conveyer 10 is controlled based on a detection signal from the sensor 13*a*, and the second belt conveyer 10 is put in a standby state so as to immediately feed the medicine stick 5 to a medicine feeding container 11 described later. As in the case of the first belt conveyer 6, as shown in FIG. 5, the second belt conveyer 10 is constituted such that a belt 10*c* is laid on rotary shafts 10*a*, 10*b*, and a driving force of a second motor 15 is transmitted to one rotary shaft 10*a* via a gear 10*d*. Furthermore, a pressing portion 16 is protruded above an entrance of the passage 14. When the medicine housing container 3 is attached to the medicine feeding section 4, the pressing portion 16 rotates the door 8 while pressing a top thereof so that the medicine housing container 3 and the passage 14 become continuous.

Figure 3:
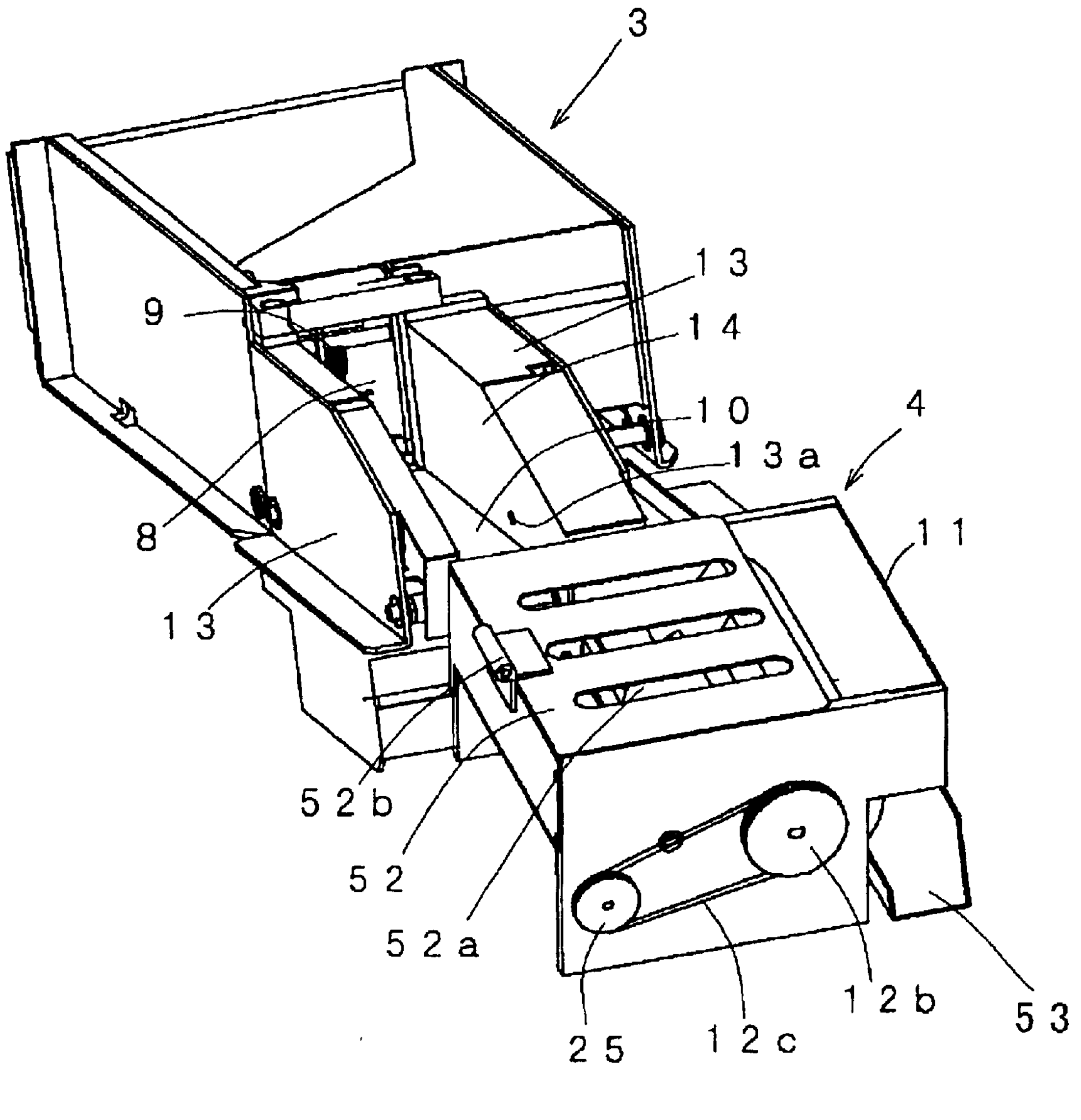
FIG. 3 is a perspective view showing the medicine feed unit according to this embodiment.
Figure 4:
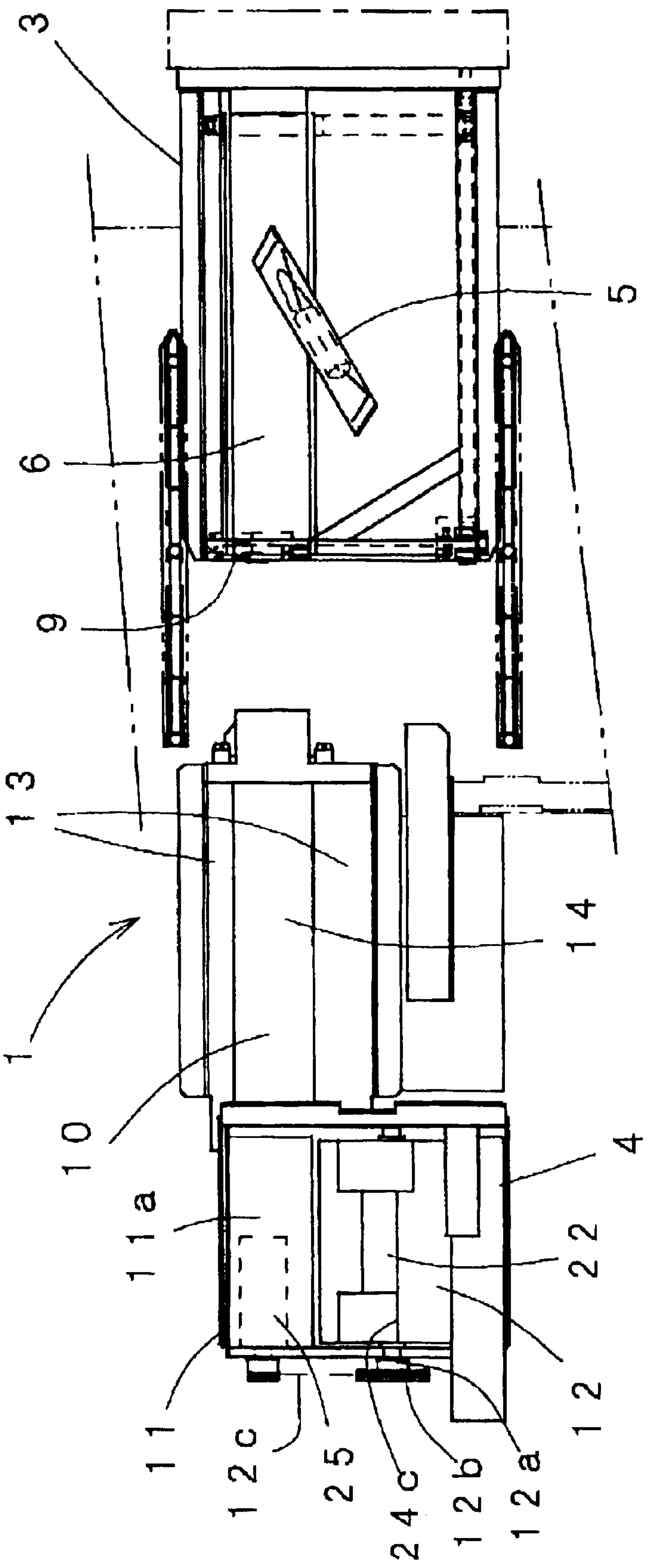
FIG. 4 is a plan view showing the medicine feed unit according to this embodiment.
Figure 6:
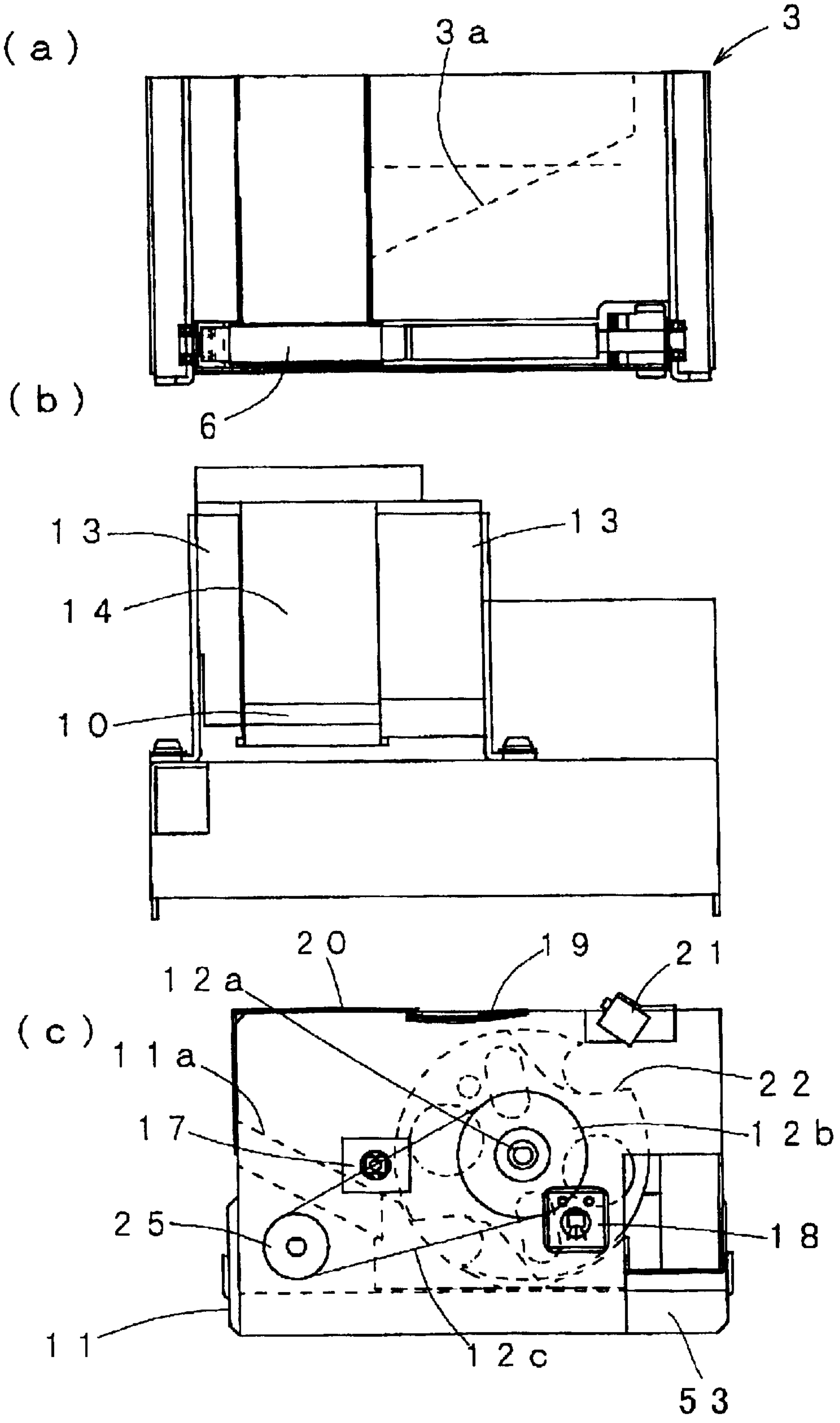
FIG. 6(*a*) is a view along 6*a* in FIG. 5, FIG. 6(*b*) is a cross sectional view along 6*b*—6*b*, and FIG. 6(*c*) is a cross sectional view along 6*c*—6*c;*
Figure 7:
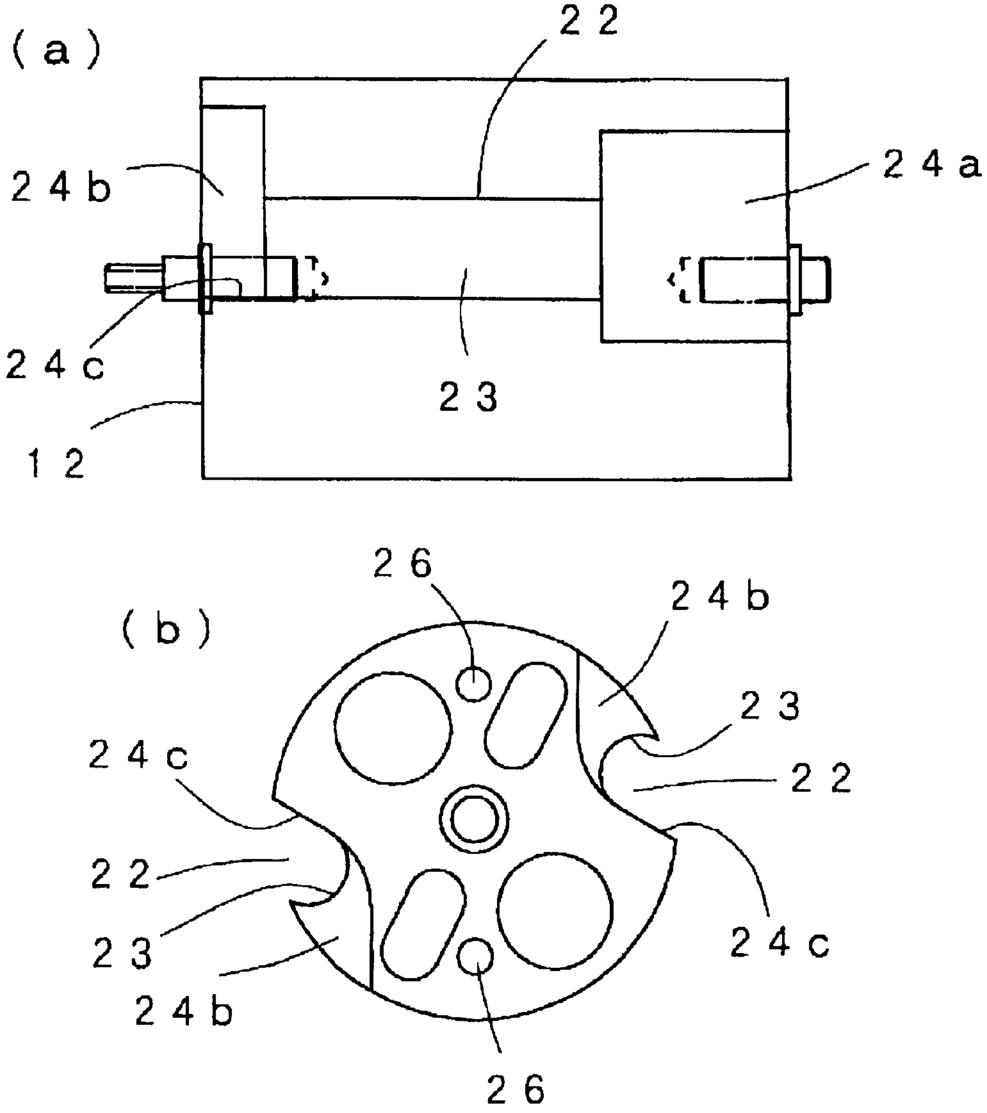
FIG. 7(*a*) is a front view showing a rotor shown in FIG. 2, and FIG. 7(*b*) is a side view thereof.

As shown in FIGS. 2 and 3, the medicine feeding container 11 is generally box-like, and is inclined diagonally downward from the second belt conveyer 10 toward the conveyance direction. A top surface opening of the medicine feeding container 11 is opened or closed by a door 52 rotatably connected by a hinge 52*b*. Three slit-like sight holes 52*a* closed by plates having transmittance are arranged next to each other in the door 52. Furthermore, the medicine feeding container 11 is constituted by an inclined surface 11*a* having a part of a bottom surface inclined diagonally downward toward a direction perpendicular to the conveyance direction. A step 50 depressed in a plate thickness direction is formed in each of the both end portions of the inclined surface 11*a*, and the medicine stick 5 conveyed by the second belt conveyer 10 is hooked to the inclined surface 11*a* at wider portions of the both end portions, and hence jamming is prevented. The medicine stick 5 positioned at a lowest portion of the inclined surface 11*a* is detected by a first medicine detection sensor 17 disposed on one end wall. A rotor 12 described later is disposed on a side of the inclined surface 11*a*, and a rotation position detection sensor (Hall IC) 18 for detecting a rotation position of the rotor 12 is disposed on one end wall as shown in FIG. 6(*c*). Furthermore, a guide wall 20 having a brush 19 and a second medicine detection sensor 21 for detecting a medicine stick 5 held in the holding depressed portion 22 of the rotor 12 are disposed thereabove. The guide wall 20 and the brush 19 scrape off excess medicine sticks 5, and only one medicine stick 5 can be held in the holding depressed portion 22 of the rotor 12.

The rotor 12 is generally circular cylindrical as shown in FIGS. 2, 6(*c*), 7(*a*) and 7(*b*), and holding depressed portions 22 are formed at two symmetrically positioned sites on an outer peripheral surface. The holding depressed portion 22 is composed of a holding groove 23 for holding a body of the medicine stick 5 and escape depressed portions 24*a*, 24*b* formed on both end portions thereof. One escape depressed portion 24*a* is formed so as not to be brought into contact with sealed portions 5*b* while holding the body 5*a* of the medicine stick 5 in the holding groove 23. The other escape depressed portion 24*b* is a contact surface 24*c* disposed in a same plane as a bent surface of which part constitutes the holding groove 23. Consequently, when the medicine stick 5 positioned at a lowest portion of the medicine feeding container 11 is held by the holding depressed portion 22 of the rotor 12, the medicine stick 5 is inclined, thereby preventing occurrence of jamming or the like. Furthermore, a thin circular plate 51 is integrally formed on one end surface of the rotor 12 (on a side of the escape depressed portion 24*b*). The circular plate 51 is positioned in a depressed portion (not shown) formed in a sidewall constituting the medicine feeding container 11 and is located on a same plane as an inner surface of the sidewall. The circular plate 51 prevents the medicine stick 5 from being inclined due to a contact with the sidewall of the medicine feeding container 11 when the rotor 12 rotates while holding the medicine stick 5 in the holding groove 23. Consequently, an operation of conveying the medicine stick 5 can be stabilized. A pulley 12*b* is integrally formed with a rotary shaft 12*a* at a central portion of one end surface in the rotor 12, and motive power is transmitted from a motor 25 via a belt 12*c* put on the pulley 12*b* to reciprocally rotate the pulley 12*b*. Furthermore, a magnet 26 is disposed at a position corresponding to the holding depressed portion 22 on one end surface of the rotor 12. When the rotor 12 rotates to a predetermined position (home position), the magnet 26 is detected by the rotation position detection sensor 18, and the rotor 12 is stopped at the home position. Furthermore, at this time, the medicine stick 5 held by the holding depressed portion 22 can be detected by the second medicine detection sensor 21.

An operation of the medicine feed unit 1 is explained below.

In an operation of feeding a medicine stick 5, first, whether a medicine stick 5 is located in the holding depressed portion 22 of the rotor 12 stopped at the home position is detected by the second medicine detection sensor 21. When the medicine stick 5 is detected, the rotor 12 is rotated to feed this medicine stick 5. When the medicine stick 5 is not detected, whether a medicine stick 5 exists in the medicine feeding container 11 is detected by the first medicine detection sensor 17.

When a medicine stick 5 is detected, the rotor 12 is rotated to feed the detected medicine stick 5 while being held by the holding depressed portion 22. Whether this medicine stick 5 is appropriately fed is judged based on a detection signal from the second medicine detection sensor 21 as described above.

On the other hand, when a medicine stick 5 is not detected, a first motor 7 and a second motor 15 are driven synchronously to operate the first belt conveyer 6 and the second belt conveyer 10. Consequently, the medicine stick 5 in the medicine housing container 3 is conveyed from the passage 14 to the medicine feeding container 11. The medicine stick 5 cannot pass in a horizontal direction thereof due to a narrow width of the passage 14 and is inevitably conveyed in the longitudinal direction. It is preferable that a conveyance speed by the second belt conveyer 10 is made higher than that of the first belt conveyer 6 by changing a voltage applied to the motor 25 or a gear ratio since the medicine stick 5 is hardly jammed, and hence a smooth conveyance can be achieved.

The medicine stick 5 conveyed to the medicine feeding container 11 is moved diagonally downward by the inclined surface 11*a*, and, when the medicine stick 5 is detected by the first medicine detection sensor 17, the rotor 12 is rotated and feeding of one medicine stick 5 is detected by the second medicine detection sensor 21.

The medicine stick 5 fed from the rotor 12 of the medicine feeding container 11 via a chute 53 is dropped into a tray 55 on a belt conveyor 54 disposed at a bottom portion of the medicine feeding apparatus 2 by a lifter (not shown) disposed behind the medicine feed unit 1 in the medicine feeding apparatus 2. The tray 55 is conveyed on the belt conveyor 54 while similarly receiving other medicines from each medicine feed unit 1. The medicine in the tray 55 is housed in a bucket 57 fed from a bucket stocker 56. An envelope, which is fed from an envelope roll 58*a* and on which a patient name and the like are printed by a printer 59, and a sheet of paper, which is fed from a paper roll 58*b* and on which prescription information is printed by the printer 59, are also housed in the bucket 57. The bucket 57 housing the medicine, envelope and paper is discharged to the outside of the medicine feeding apparatus 2.

Thereafter, similarly, the aforementioned operations are repeated until a predetermined amount of medicine sticks 5 are fed. Then, by the aforementioned operations, when a medicine stick 5 cannot be detected by either of the sensors 17, 21, a stockout is determined, and a signal is sent to this effect. An operator removes the medicine housing container 3 from the medicine feeding section 4 of the medicine feeding apparatus 2 following a signal command. At this time, the second belt conveyer 10 is driven, and reverse rotation of the first belt conveyer 6 is driven. Consequently, the medicine stick 5 positioned in the vicinity of the door 8 of the medicine housing container is moved, and, when the medicine housing container 3 is removed, the door 8 is closed smoothly without being prevented from rotating. Furthermore, when medicine sticks 5 are housed in the removed medicine housing container 3, the medicine sticks 5 do not need to be aligned, thereby requiring only a short time of work. Then, the medicine housing container 3 is attached to the medicine feeding section 4. At this time, the pressing portion 16 rotates the door 8 of the medicine housing container 3, which then becomes continuous with the passage 14. Consequently, the medicine stick 5 can be conveyed.

Furthermore, when no detection signal is sent from a rotation position detection sensor 18 and rotation failure of the rotor 12 occurs due to jamming of a medicine stick 5 or the like during an operation of feeding the medicine stick 5, the rotor 12 is once rotated reverse for a predetermined time and then rotated forward. Consequently, jamming of a medicine stick 5 or the like can be rapidly eliminated, and hence a favorable feeding state can be recovered. In the case where rotation failure is not eliminated even by the reverse rotation of the rotor 12, it is sufficient to give an error signal and stop the apparatus.

Figure 9:
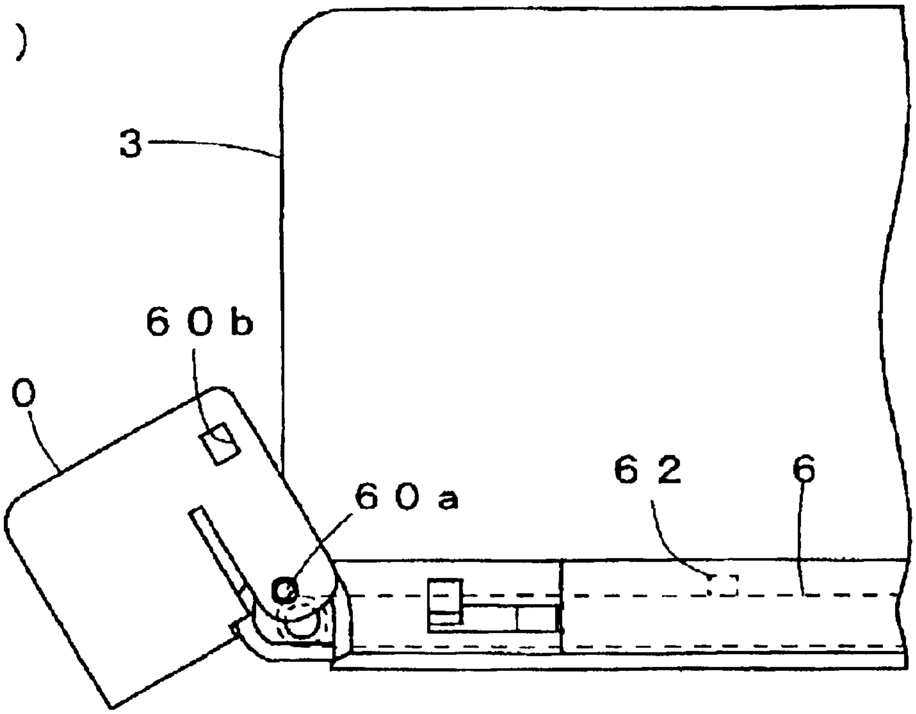
FIG. 9 shows a medicine housing container according to another embodiment, of which FIG. 9(*a*) is a partial side view and FIG. 9(*b*) is a plan view thereof.
Figure 9:
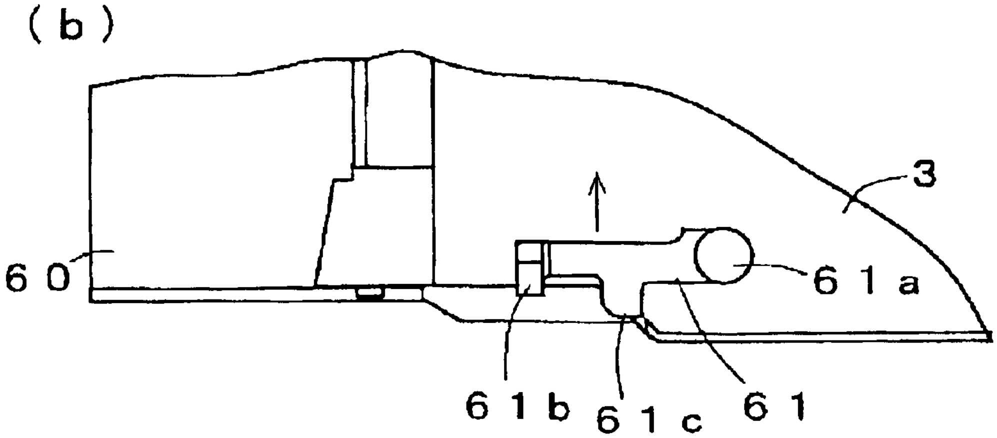

In this embodiment, one end side opening of the medicine housing container 3 is opened and closed by a door 8, but a door 60 rotating about a spindle 60*a* may be provided as shown in FIGS. 9(*a*) and 9(*b*).

Figure 10:
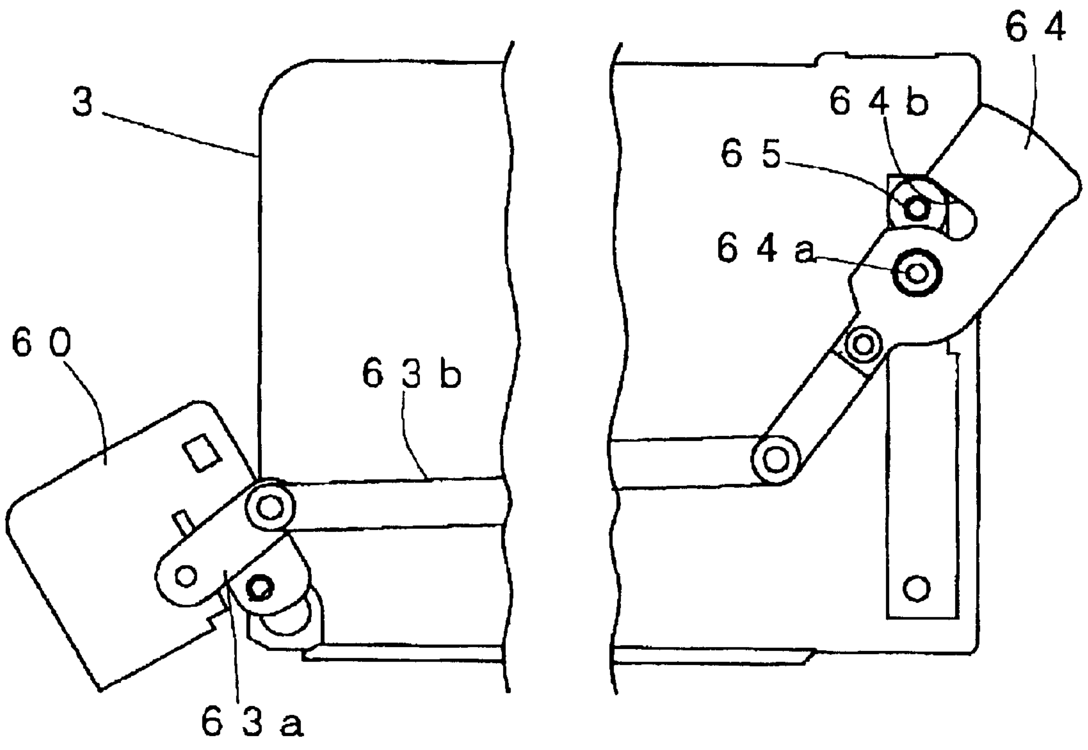
FIG. 10 is a side view showing the other side of the medicine housing container shown in FIG. 9(*a*)

The door 60 has a sidewall of which both end portions are bent at a right angle, and an engaged hole 60*b* is formed therein. An engaged protrusion 61*b* formed at one end of a hook 61 is engaged with and released from the engaged hole 60*b*. The hook 61 fixes a shaft 61*a* formed in a central portion in the medicine housing container 3. Then, after the medicine housing container 3 is attached to the medicine feeding apparatus 2, an indented portion 61*c* is indented by a protrusion (not shown) or the like in an arrow direction and elastically deformed so that the engaged protrusion 61*b* is released from the engaged hole 60*b*. When the engaged protrusion 61*b* is released from the engaged hole 60*b*, the door 60 rotates about the spindle 60*a* due to its self-weight in an anticlockwise direction in FIG. 9(*a*). Furthermore, as shown in FIG. 10, the door 60 closes a lower half of the opening on one end side by indenting the medicine housing container 3 to rotate a lever 64 provided rotatably about the spindle 64*a* via links 63*a*, 63*b*. A notch 64*b* is formed in the lever 64, and a shaft 65 disposed in the medicine housing container 3 is released. Consequently, an opening position of the door 60 is regulated by an indented position of the lever 64, that is, via the links 63*a*, 63*b*.

The lever 64 is utilized when the medicine housing container 3 is removed from the medicine feeding apparatus 2. That is, in a usual removal work, the door 60 is automatically closed by a solenoid (not shown), and, when there are a large number of medicines at the door 60 and in the vicinity thereof or the like, the door 60 cannot be smoothly closed. If the medicines are ampoules or the like, these may be broken. Therefore, a force for the solenoid to act on the door 60 is made of a degree that the medicines are not broken. Since the lever 64 is protruded when the door 60 is not closed, whether the door is appropriately closed can be confirmed. When the lever 64 is protruded, this lever 64 is manually operated to close the door 60. However, when a risk that the medicines may be broken is expected from a feel of the lever 64, the medicine housing container 3 is removed as it is while trying not to drop the medicine.

Furthermore, such a protrusion 62 as shown in FIG. 9(*a*) may be formed on the first belt conveyer 6 in the medicine housing container 3. It is preferable that the medicine stick 5 which is to be held in the horizontal direction at an end of the first belt conveyer 6 can be forcibly conveyed to the second belt conveyer 10 in the vertical direction by this protrusion.

Figure 11:
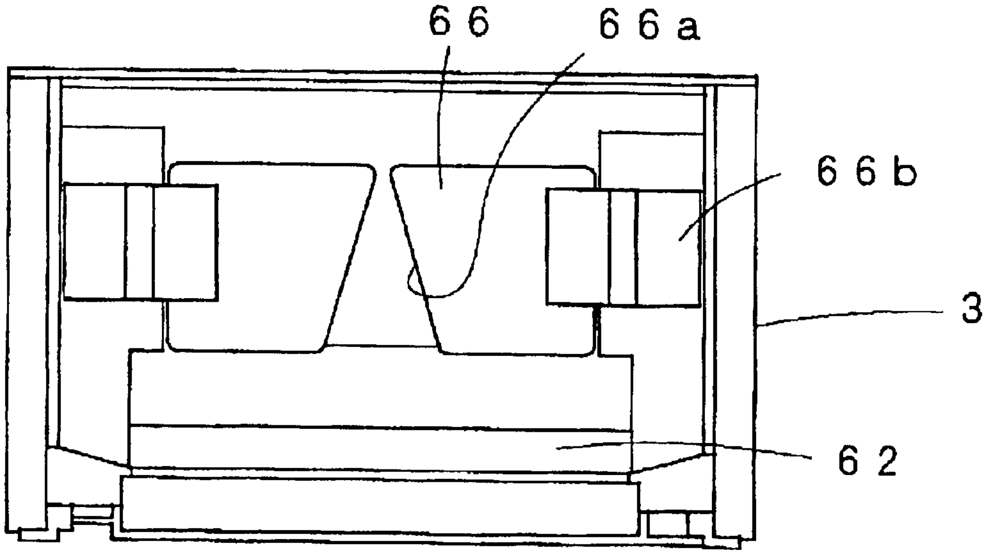
FIG. 11 is a front view showing an example of a door disposed at an exit from a second belt conveyer to the medicine feeding container.

Furthermore, a medicine stick 5 is directly fed to the medicine feeding container 11 by the second belt conveyer 10 in this embodiment, but, as shown in FIG. 11, a pair of doors 66 rotatable about a hinge 66*b* are preferably disposed. Only a front side of the door 66 is rotatable in FIG. 10 and can be returned to a closed position shown in FIG. 11 by a spring (not shown). Consequently, a problem does not arise that a medicine stick 5 is jammed in the door 66 and cannot be conveyed. The door 66 has an inclined portion 66*a* of which opposed edges gradually become more distant from each other downwards. Furthermore, a rear surface of the door 66 (back side surface in FIG. 11) is gradually inclined toward a front surface downwards. Furthermore, due to these inclined structures, a problem can be prevented that a medicine stick is jammed in the door 66 and broken even when the conveyed medicine stick 5 is an ampoule (in this embodiment, an ampoule is also included in the medicine stick 5). The door 66 may be constituted by one plate that rotates by using an upper edge portion as a spindle as in the case of the door 8. Furthermore, instead of the door 66, a brush composed of a plurality of elastic hair components protruded downwards may be provided.

Figure 12:
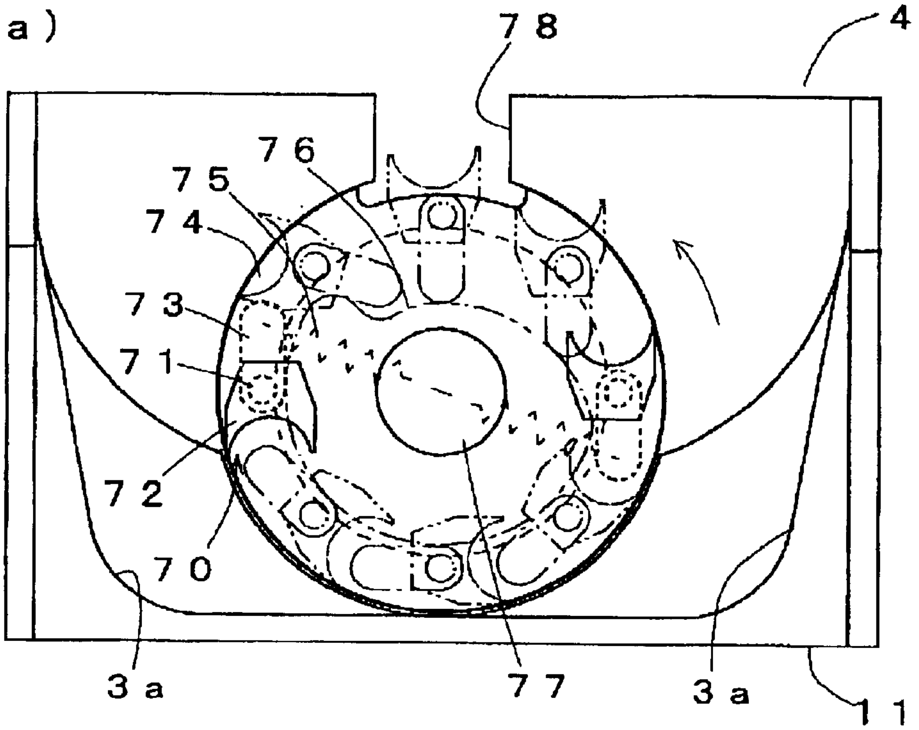
FIG. 12 shows a medicine feeding section according to another embodiment, of which FIG. 12(*a*) is a front view and FIG. 12(*b*) is a plan view.
Figure 12:
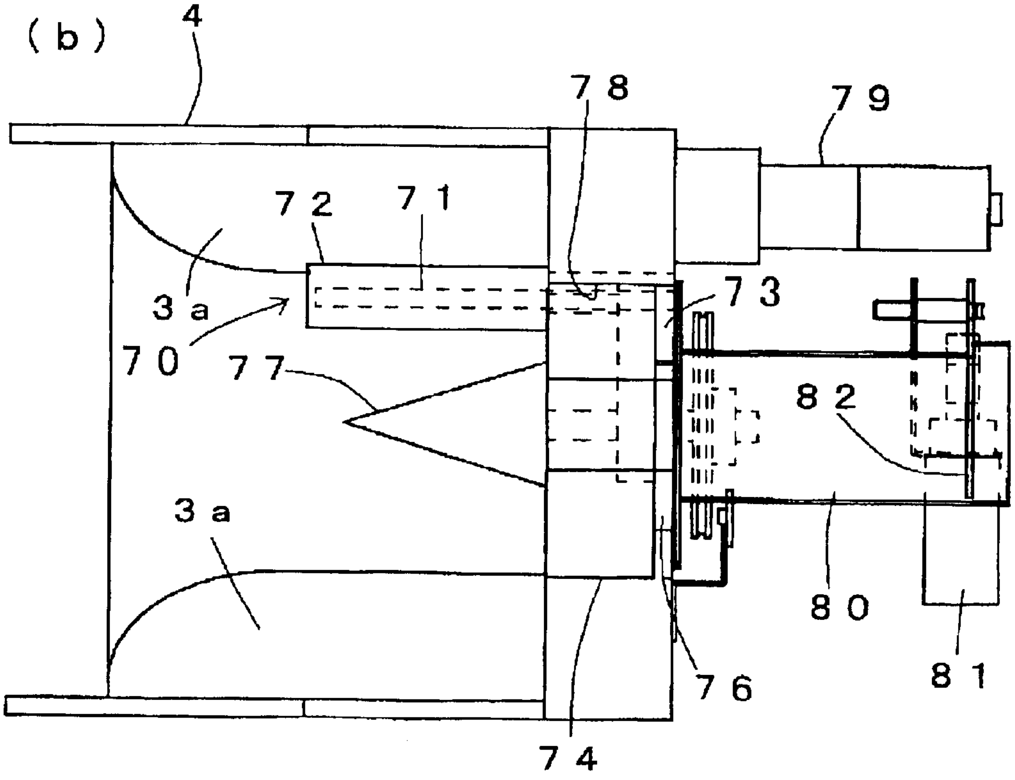

Furthermore, in this embodiment, a medicine stick 5 is discharged from the medicine feeding container 11 by the rotor 12, but may be discharged by a picker 70 as shown in FIG. 12.

The picker 70 is constituted such that one end portion of a link 73 is integrally formed with one end of a spindle 71 inserted rotatably in parallel to a rotary shaft core and a holding portion 72 is integrally formed with the other end of the spindle 71 at symmetrical two sites (in FIG. 12(*b*), the other picker is omitted) of a rotating disc 74 rotated by a motor 79, respectively, and the other end portion of the link 73 is energized by a spring 75 toward a rotation center of the rotating disc 74 and moved along an outer peripheral edge of a cam 76 fixed to the medicine feeding container 11. Consequently, the holding portion 72 fixed to the link 73 is moved from a first position, at which a medicine stick is scooped, to a second position, at which the medicine stick is fed to the outside, while changing a direction of a bent surface for holding medicines by driving a motor 79 to rotate the rotating disc 74 as shown with an alternate long and two short dashes line in FIG. 12. A plurality of small protrusions may be provided at an outer peripheral edge of the cam 76. That is, when the link 73 is slidably brought into contact with the small protrusions, the holding portion 72 is slid in a fine range, and hence the holding portion 72 can be reliably prevented from holding two or more medicines.

Furthermore, a conical protruded portion 77 protruded in parallel to the rotary shaft core of the rotating disc 74 is integrally formed in a central portion of a front surface of the rotating disc 74. When the rotating disc 74 is rotated, the protruded portion 77 plays a role of aligning a standing medicine stick 5 to the horizontal position. However, the number of sites of the protruded portion 77 is not limited to one, but the protruded portion 77 may be provided at two or more sites. For example, the protruded portions 77 can be provided at point-symmetrical positions with respect to a rotation center. An inclined portion 3*a* is formed in an inner surface of the medicine feeding container 11, and medicines can also be aligned in the horizontal direction by this inclined portion 3*a*.

Furthermore, the medicine feeding container 11 is equipped with a discharge passage 80 on a rear surface side via an opening 78 located at a position vertically above the rotating disc 74. A shutter 82 opened and closed by the drive of a solenoid 81 is disposed at an end of the discharge passage 80.

By the aforementioned medicine feeding container 11 equipped with the picker 70, medicines are reliably held by the holding portion 72 of the picker 70 one by one. Since the medicine feeding container 11 is inclined, the medicine held by the holding portion 72 is moved to the discharge passage 80 through the opening 78 at a point when the picker 70 is moved in an arrow direction and located at the vertically above position. At this time, when the cam 76 is provided with a protrusion to slide the holding portion 72 via the link 73, the medicine stick 5 held by the holding portion 72 can be smoothly discharged to the discharge passage 80. In the discharge passage 80, the medicine is once held by the shutter 82 disposed at an end thereof and then discharged when the shutter 82 is opened by a drive of the solenoid 81. The discharge passage 80 may be located at a position at which the medicine stick 5 can be discharged by rolling of the picker 70 along a rotation direction.

As evident from the above description, according to the present invention, since the medicine stick can be conveyed by the conveyance means only in the longitudinal direction and fed by the rotor one by one, work for aligning the medicine sticks can be omitted, and hence operatability can be significantly improved.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A medicine feed unit equipped with a medicine housing container for housing a plurality of medicine sticks each prepared by packaging a medicine in a cylindrical bag sealed at both end portions, and a medicine feeding section to which the medicine housing container is removably attached and which feeds the medicine sticks one by one, wherein the medicine feeding section comprises:

conveyance means having a passage which allows the medicine stick to be conveyed only in a longitudinal direction thereof;

a medicine feeding container having an inclined surface acting to move the medicine stick conveyed by the conveyance means in a diagonally downward direction which is perpendicular to the longitudinal direction of the medicine stick; and a rotor which is disposed in the medicine feeding container so as to be drivable into rotation, and which conveys the medicine stick moved along the inclined surface while holding the medicine stick in a holding depressed portion formed in an outer periphery thereof.

2. The medicine feed unit according to claim 1, wherein the holding depressed portion of the rotor comprises a holding groove for holding a body of the medicine stick, and an escape depressed portion for avoiding interference with both end portions.

3. The medicine feed unit according to claim 1, wherein the medicine feeding container is inclined diagonally downward toward the medicine stick conveyance direction.

4. The medicine feed unit according to claim 3, wherein the holding depressed portion of the rotor has a contact surface which is formed in a part of the escape depressed portion positioned on a lower side and which assists a medicine stick in entering the holding groove by correcting an inclination when held by the holding groove.

5. The medicine feed unit according to claim 1, wherein the medicine housing container is equipped with delivering means for delivering the medicine stick in the longitudinal direction thereof.

6. The medicine feed unit according to claim 5, wherein a speed of conveying the medicine stick by the conveyance means of the medicine feeding section is made higher than a delivering speed by the delivering means.

7. The medicine feed unit according to claim 1, wherein when the rotor does not properly rotate forward, the rotor is rotated reverse for a predetermined time and then rotated forward again.

8. The medicine feed unit according to claim 5, wherein the medicine housing container includes an opening which becomes continuous with the passage of the medicine feeding section when the medicine housing container is attached to the medicine feeding section, and a door which closes the opening when the medicine housing container is removed from the medicine feeding section.

9. The medicine feed unit according to claim 8, wherein for removal of the medicine housing container from the medicine feeding section, the delivering means is driven into reverse rotation.

10. The medicine feed unit according to claim 1, wherein steps depressed toward a plate thickness direction are formed in both end portions of the inclined surface of the medicine feeding container along the medicine stick conveyance direction.

11. The medicine feed unit according to claim 1, wherein a circular plate is integrally formed at least on one end face of the rotor.

12. A medicine feed unit equipped with a medicine housing container for housing a plurality of medicine sticks each prepared by packaging a medicine in a cylindrical bag sealed at both end portions, and a medicine feeding section to which the medicine housing container is removably attached and which feeds the medicine sticks one by one, wherein the medicine feeding section comprises:

conveyance means having a passage which allows the medicine stick to be conveyed only in a longitudinal direction thereof;

a medicine feeding container for housing the medicine stick conveyed by the conveyance means; and a picker in which a rotating disc is disposed in the medicine feeding container so as to be drivable into rotation and is equipped with a holding section that can be changed in direction along with a rotation of the rotating disc between a first position, at which a medicine stick in the medicine feeding container is scooped, and a second position, at which the scooped medicine stick is fed to outside.

13. The medicine feed unit according to claim 12, wherein the rotating disc is provided with a conical protruded portion protruding in parallel to a rotary shaft core of the rotating disc.

14. The medicine feed unit according to claim 12, wherein the medicine feeding container is inclined diagonally downward toward the medicine stick conveyance direction.

15. The medicine feed unit according to claim 12, wherein the medicine housing container is equipped with delivering means for delivering the medicine stick in the longitudinal direction thereof.

16. The medicine feed unit according to claim 15, wherein a speed of conveying the medicine stick by the conveyance means of the medicine feeding section is made higher than a delivering speed by the delivering means.

17. The medicine feed unit according to claim 12, wherein when the rotating disc does not properly rotate forward, the rotating disc is rotated reverse for a predetermined time and then rotated forward again.

18. The medicine feed unit according to claim 15, wherein the medicine housing container includes an opening which becomes continuous with the passage of the medicine feeding section when the medicine housing container is attached to the medicine feeding section, and a door which closes the opening when the medicine housing container is removed from the medicine feeding section.

19. The medicine feed unit according to claim 18, wherein for removal of the medicine housing container from the medicine feeding section, the delivering means is driven into reverse rotation.

* * * * *